United States Patent

[11] 3,586,301

| [72] | Inventors | James L. Shipp<br>Bogalusa, La.;<br>Joe E. Salmon, Prattville, Ala. |
|---|---|---|
| [21] | Appl. No. | 861,624 |
| [22] | Filed | Sept. 29, 1969 |
| [45] | Patented | June 22, 1971 |
| [73] | Assignee | Continental/Moss-Gordin, Inc.<br>Prattville, Ala. |

[54] AGRICULTURAL PRODUCTS DRYING HEATER
8 Claims, 6 Drawing Figs.

| [52] | U.S. Cl. | 263/19 A |
|---|---|---|
| [51] | Int. Cl. | F23l 9/04 |
| [50] | Field of Search | 263/19 A |

[56] References Cited
UNITED STATES PATENTS
3,057,611  10/1962  Bjerkan ..................... 263/19 A Primary Examiner—John J. Camby
Attorney—Mason, Fenwick & Lawrence ABSTRACT: An agricultural products drying heater unit including an airfoil member, a burner ring structure, and a motor-driven fan arranged serially between the inlet and outlet ends of a cylindrical tubular elongated shell. The airfoil member has an axially elongated cylindrical center tube portion coaxial with the shell and a truncated conical skirt portion diverging outwardly and downstream from the upstream end of the center tube portions to cool the motor and to produce turbulence at the burner ring structure to produce such temperature uniformity across the shell outlet area that the heated air temperatures at either outlet side of a tandem valve will be substantially the same.

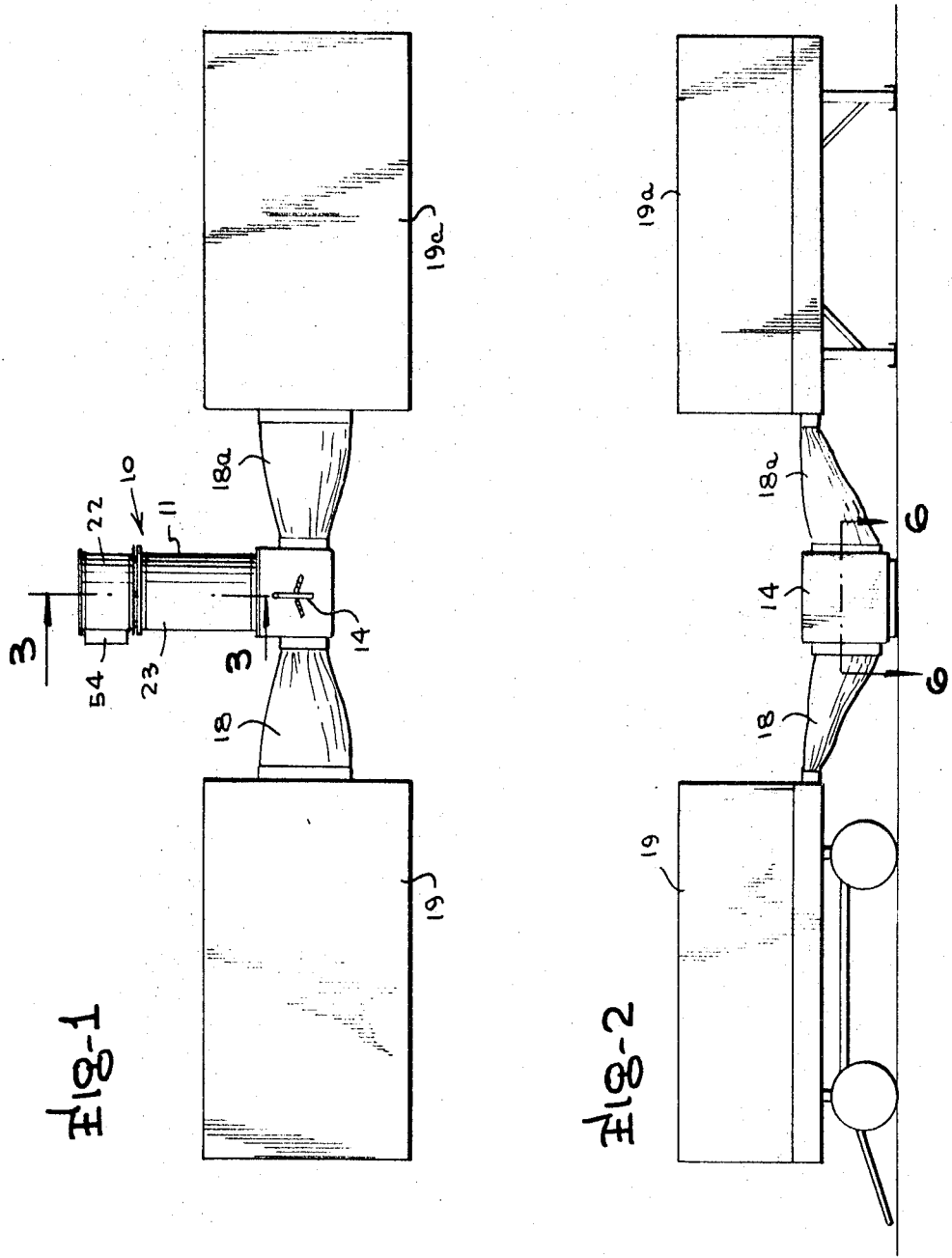

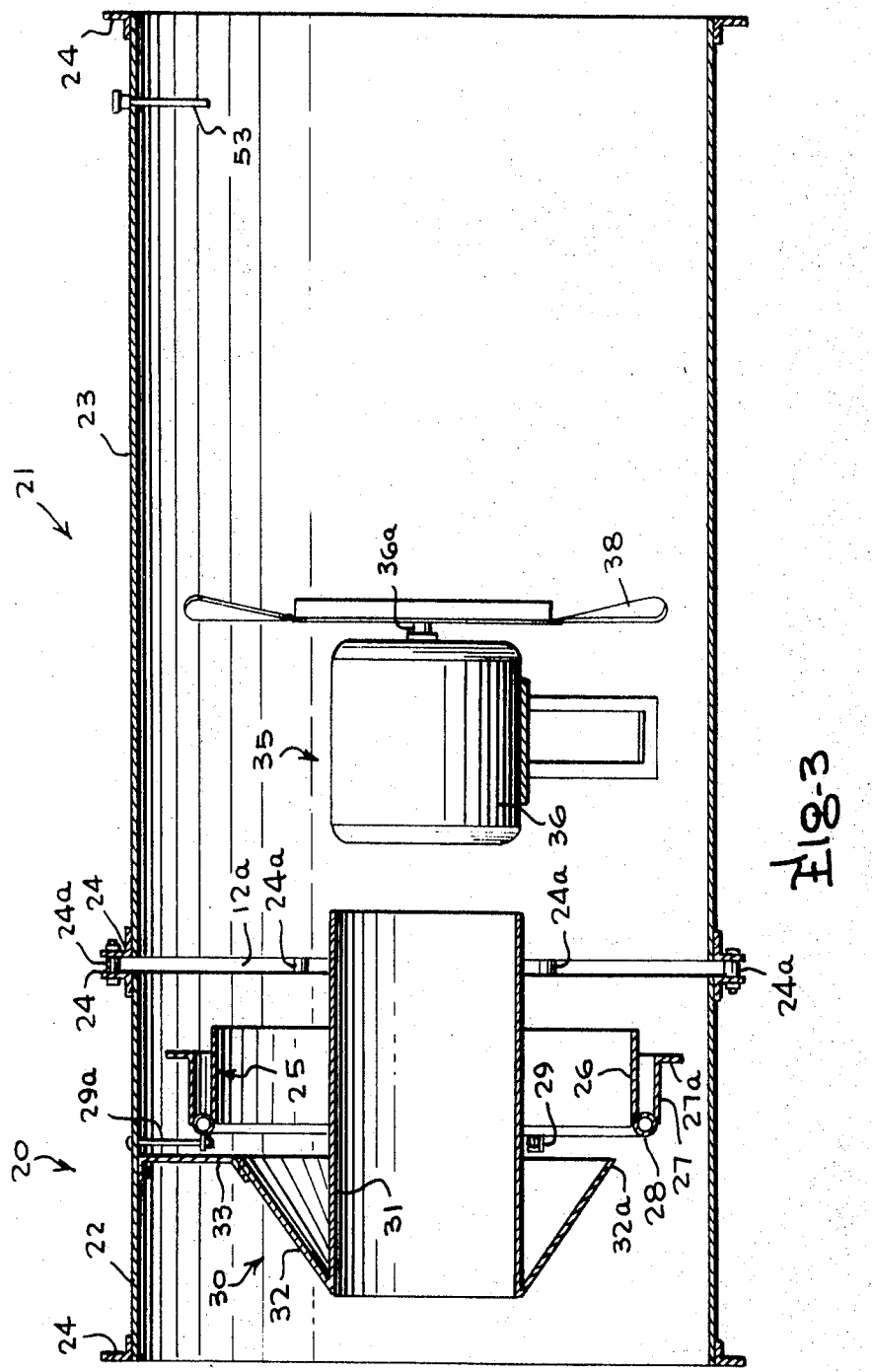

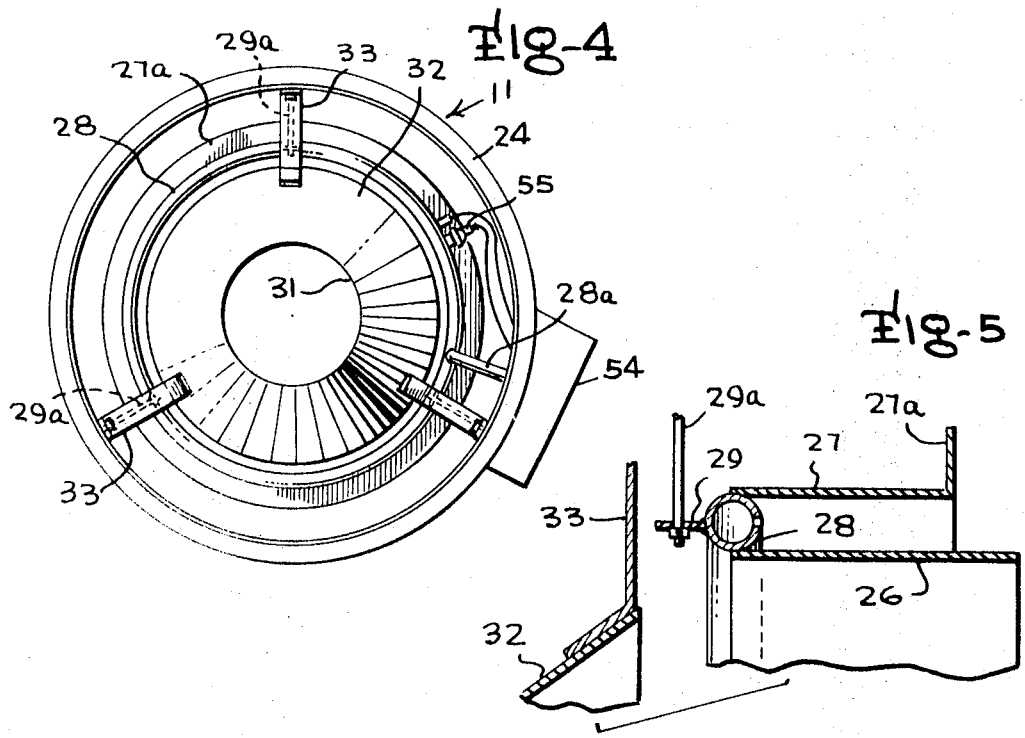
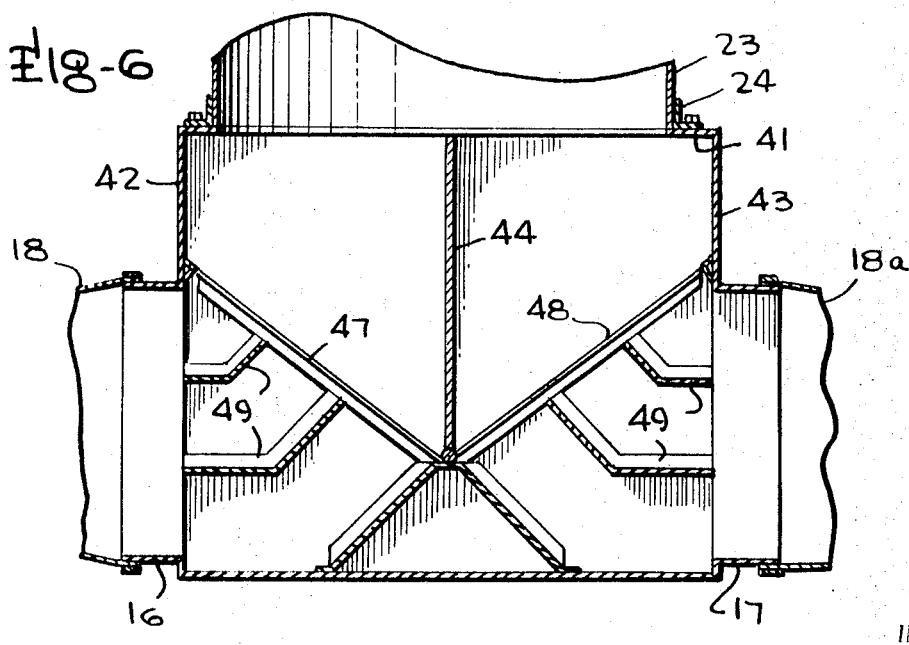

AGRICULTURAL PRODUCTS DRYING HEATER

BACKGROUND AND OBJECTS OF THE INVENTION

The present invention relates in general to agricultural crop-drying heaters, designed to effect drying of crops by propelling heated air through a tubular shell or conduit into a storage receptacle, such as a crop-drying bin, to effect drying of the crops, and particularly to an agricultural crop-drying heater in the form of a burner-blower combination wherein the air is heated in such a way that the distribution of the air across the area of the outlet end of the shell of the heater unit is substantially uniform such that, when the heater unit is connected through a tandem valve with two portable drying bins, the air is divided and delivered to the two bins at substantially the same temperatures.

Heretofore, fan-type agricultural crop-drying heaters have been employed, wherein a burner ring for combustible gases heats air flowing through a circular casing adjacent propeller-type fan blades in the casing, to deliver heated air to crop-drying bins for drying the crops. It has been common to connect such heaters through a tandem valve with two portable drying bins, so that the air can be divided between the two bins and delivered simultaneously to the two bins, or the air can be deflected entirely to one side or the other, such as during the changing of one of the portable drying bins.

It has been found, however, that a particular problem is encountered when such conventional crop dryers are connected by tandem valve with two drying bins in such a typical hookup, because a significant variation occurs between the temperatures delivered to one bin and those delivered to the other. This was initially thought to be a maladjustment of the valve, but careful examination revealed that the difficulty was because of a difference in the air temperature discharged through each leg of the valve rather than any maladjustment of the valve. Study revealed that, contrary to common belief, the heated gases from the burner ring did not thoroughly mix with the incoming airstream to obtain equilibrium in all molecules, and it was discovered that there was a definite lamination of cold and hot areas that traveled some distance downstream before a state of equilibrium was reached. While reasonable equilibrium temperatures could be obtained using a simple straight duct alone, a length of at least 10 feet for a 36 inch diameter heater is required to achieve this, imposing impractical space requirements. Other expedients were tried in an effort to cause the heated gas to mix with the incoming ambient air, such as using curved blades to add more swirl to the air and using perforated sheets across the duct, but these approaches did not cure the problem.

It was discovered, however, that by employing an airfoil section immediately upstream from the burner having a cylindrical duct portion which extends centrally through the burner ring to the vicinity of the fan motor and an outwardly diverging conical section which extends from the upstream edge of the cylindrical duct section to a location adjacent the burner ring, cooling of the motor is accomplished and sufficient turbulence is introduced due to the lowered pressure between the conical section and the outwardly surrounding walls of the cylindrical duct shell and by introducing secondary air through a circumferential slot downstream of and adjacent to the burner ring, to cause a thorough mixing, particularly through the added turbulence around the burner ring. It was found that with such an arrangement, heated air could be delivered to both sides of the tandem valve toward the respective drying bins with temperatures at both sides maintained within approximately a 1° maximum difference from each other, whereas the prior constructions produced outputs which varied as much as 10° or 12° from one side of the valve to the other.

An object of the present invention, therefore, is the provision of a novel agricultural crop drying heater, which effects sufficiently thorough mixing of incoming air with the heated gases to provide close uniformity in the temperature of the air diverted by a tandem valve to either side into drying bins, and which effects even mixing of heat and air to eliminate hot and cold streaks in the duct system.

Other objects, advantages and capabilities of the present invention will become apparent from the following detailed description, taken in conjunction with the accompanying drawings illustrating a preferred embodiment of the invention.

BRIEF DESCRIPTION OF THE FIGURES

FIG. 1 is a top plan view of an agricultural crop drying heater embodying the present invention, illustrated in an assembly with a tandem valve and a pair of portable drying bins in a typical tandem drying hookup;

FIG. 2 is an end elevation of the tandem hookup, showing the tandem valve assembly connected to two drying bins;

FIG. 3 is a vertical longitudinal section view through the crop-drying heater, taken along the line 3–3 of FIG. 1;

FIG. 4 is an end view of the heater, taken from the air inlet end;

FIG. 5 is a fragmentary vertical section view, to enlarged scale, of adjacent portions of the burner ring and airfoil member; and FIG. 6 is a horizontal section view of the tandem valve, taken along the line 6–6 of FIG. 2.

DETAILED DESCRIPTION OF A PREFERRED EMBODIMENT

Referring to the drawings, wherein like reference characters designate corresponding parts throughout the several figures, and particularly to FIGS. 1 and 5, the agricultural crop drying heater of the present invention, indicated generally by the reference character 10, comprises an axially elongated outer heater shell 11 of generally cylindrical configuration, having an upstream end 12 and a downstream end 13. In the typical tandem installation illustrated, the downstream end 13 is connected directly to a tandem valve unit 14 of a construction to be later described, having a generally rectangular or cube-shaped casing 15, from which a pair of short outlet ducts 16, 17 extend laterally in opposite directions, for connection to canvass or similar flexible conduit tubes 18, 18a to respective drying bins 19, 19a of conventional construction. These bins 19, 19a may be of any conventional construction, either of the wheel-type in the form of four-wheel trailers or two-wheel trailers, or as movable drying bins with legs, or as stationary bins. Customarily, such drying bins include an upper compartment for retaining the agricultural products to be dried, with a perforated false bottom forming the floor of the compartment, below which is a lower plenum chamber section into which the heated air is delivered by the flexible conduit tubes 18, 18a.

The crop-drying heater unit 10, as is more clearly illustrated in FIGS. 2, 3 and 4, comprises a burner section 20 starting at the upstream or inlet end 12 of the shell 11 and continuing for a minor portion of the axial length of the heater unit 10, and a fan section 21 forming the remainder of the heater unit extending to the downstream end 13. The outer heater shell 11 is formed of the cylindrical tubular casing 22 of the burner section 20 and the cylindrical tubular casing 23 of the fan section 21, each of which have circular angle iron flange rings 24 at their upstream and downstream ends, each having a cylindrical flange and a radial flange. The flange rings at the downstream end of the burner section casing 22 and at the upstream end of the fan section casing 23 are bolted together as shown with multiple tubular spacers 24a around each bolt therebetween to define a circumferential secondary air inlet slot 12a around the elongated tubular shell providing the cylindrical conduit for the delivery of heated air to the tandem valve unit 14.

The burner unit 25 is located within the burner section casing 22 substantially midway of its axial length, and comprises a burner ring assembly formed of an inner cylindrical ring or wall member 26, an outer cylindrical ring or wall member 27 coaxial with the inner ring 26 terminating in an outwardly projecting radial flange 27a at its downstream end lying in a plane perpendicular to the axis of the burner ring and spaced inwardly at its perimeter from the burner section casing 22. The upstream ends of the two burner rings 26, 27, terminate in a common transverse plane perpendicular to the axis of the burner ring and spaced inwardly at its perimeter from the burner section casing 22. The upstream ends of the two burner rings 26, 27, terminate in a common transverse plane perpendicular to the axis of the burner ring and are joined to diametrically opposite portions of a circular burner pipe 28 to which gaseous fuel such as butane or propane gas is supplied through an inlet pipe section 28a, the circular pipe 28 having circumferentially spaced orifices opening downstream into the annular spaced defined between the cylindrical rings 26, 27. A plurality of circumferentially spaced mounting lugs 29 extend in an upstream direction from the circular burner pipe 28 for connection to mounting bolts 29a extending inwardly from the burner section casing 22 to properly fix the burner unit 25 in the burner section 20.

Immediately upstream of the burner unit 25 is an airfoil member 30, which as illustrated in the drawings is formed simply of an elongated center tube portion or center duct portion 31 of cylindrical configuration extending from a location near the upstream end 12 of the shell 11 to a location slightly downstream from the upstream end of the fan section casing 23. Joined to the upstream end of this center tube portion or center duct portion 31, as by welding, is a truncated conical section 32 which diverges outwardly in a downstream direction from the upstream end of the center tube portion 31 to define a downstream edge 32a which is spaced slightly inwardly toward the axis of shell 11 from the upstream burner pipe portion 28 of the burner ring and is also located slightly upstream from the burner unit. The downstream edge portion 32a of the airfoil member 30 is also supported from the burner section casing 22 by a plurality of mounting arms 33 located, for example, at three circumferentially spaced locations along the downstream edge portions 32a and extending outwardly to define short mounting flanges at their outer ends which are bolted to the burner section casing 20.

A blower or fan unit, generally indicated at 35, is mounted within the fan section 21 in any conventional manner, and includes an electric motor 36 having a shaft 36a concentric with the axis of the shell 11 and blower or fan blades 38 fixed on the shaft 36a.

In a satisfactory example of the heater drier unit 10, having an axial length of 7 feet, 1 inch, the shell 11 was 37 inches in inside diameter, the outer cylindrical ring 27 of the burner unit had an inside diameter of 28 ⅛ inches, the inner ring 26 had an outer diameter of 26 inches, the diameter of the downstream edge 32a of the conical portion 32 of the airfoil section was 24 inches, and the diameter of the center tube portion 31 was 12 inches. The axial length of the conical section 32 was 8 inches, the upstream end of the airfoil member 30 was located 4 inches from the upstream end 12 of the shell 11, the axial length of the center tube portion 31 was 2 feet, and the upstream end of the fan motor 36 was spaced about 4 and ¼ inches downstream from the downstream end of the center tube portion 31. The burner casing 22 had an axial length of 2 feet, the fan section casing 23 had an axial length of 5 feet, and the air circumferential slot 12a between the joined flange rings 24 of the burner and fan section casings having an axial length of 1 inch.

The tandem valve unit 14, to which the downstream end 13 of the shell 11 is connected, comprises a cubic, box-shaped housing 40 having a circular inlet in the inlet wall 41 thereof surrounded by a pattern of boltholes so that the angle iron flange ring 24 at the downstream end of the fan section casing 23 can be bolted thereto, and the outlet collars 16 and 17 project a short distance from vertical sidewalls 42 and 43 of the housing 40 joining the inlet wall 41 at right angles thereto. Within the valve housing 40 is a valve blade 44 which is fixed at its rearmost or downstream edge on a vertical shaft 45 journaled at top and bottom in the upper and lower walls of the housing 40 and spaced slightly forwardly or in an upstream direction from the rear wall 46 of the housing 40. The valve blade 44 is rectangular in configuration and extends to the inlet wall 41 when in the centered or distributing position shown, and is movable angularly about the vertical axis through the shaft 45 to limit positions defined by the angle iron stop members 47, 48, against which the valve blade 44 rests when in the limit position diverting all of the heating drying air through the outlet collar 17 or through the outlet collar 18, respectively. The tandem valve housing 40 also houses a plurality of fixed turning vanes or splitters 49 to assist in channeling the air through the respective associated outlet collars 16, 17, and a notched bracket 50 is provided on the top wall of the housing 40 to receive a handle-forming extension 51 of the valve blade shaft 45 for locating the valve blade at a plurality of selected angular positions.

Suitable automatic control means, including a temperature sensor 53 and valve control circuitry responsive to the temperature sensor and housed in a control box 54, automatically maintain a selected temperature of the air discharged through the outlet or downstream end of the shell 11 by accurately modulating the valve regulating the supply of fuel to the burner pipe 28. A spark plug and thermocouple unit 55 is removably mounted on the outer ring 27 of the burner unit for ease of servicing of this means for igniting the burner.

With the agricultural crop drying heater unit assembled with a tandem valve and a pair of drying bins, as illustrated in FIGS. 1 and 5, it has been found that lamination of the cold and hot zones across the area of the outlet of the tubular conduit formed by the shell 11 is minimized so that, with the valve blade 44 of the tandem valve unit 14 in the center position illustrated, distributing heated air to both conduit tubes 18, 18a, and thus to both of the drying bins 19, 19a, the temperatures at the tandem valve outlets 16 and 17 are held within approximately a 1° maximum difference, whereas with prior constructions the difference in temperatures at the outlets 16 and 17 were found to be as much as 10°—12°. By the construction hereinabove described, the center tube portion 31 of the airfoil member 30 insures the delivery of cooling air across the fan motor 36 to keep it from overheating, and the conical section 32 together with the secondary air inlet slot 12a causes sufficient turbulence due to the lowered pressure between the downstream edge 32a of the conical section and the cylindrical duct defined by the shell 11, to cause a thorough mixing of the heated gases from the burner ring with the incoming air streams, mainly through the added turbulence around the burner ring.

Assuming that the apparatus of the present invention is to be used in drying peanuts, the apparatus would be set to dry the peanuts at a maximum temperature of about 105°. Peanuts are generally brought in from the field with a range of from 15 percent to as high as 25 percent moisture and are normally dried down to 10 percent moisture before being stored or processed. If prior art apparatus having the marked difference of 10—12 percent in the temperatures provided to the two outlet sides of the tandem valve unit were being used for drying peanuts, it would be apparent that a 10—12 percent differential would cause very uneven drying between the two drying bins, complicating the problem of properly timing the drying procedure for the separate bins. With the apparatus of the present invention, wherein the temperatures of the two outlets are held to within approximately a 1 percent maximum difference, two similar loads of peanuts can be started and completed at essentially the same time, because of the evenness in the temperature distribution across the area of the outlet or downstream end of the shell 11.

We claim:

1. Agricultural products-drying heater apparatus for drying agricultural products in bins to which the unit is coupled, comprising an axially elongated substantially cylindrical tubular shell having an ambient air inlet end and a heated air outlet end, a motor driven propeller-type fan mounted in said shell intermediate said ends for producing a current of air in said shell flowing from said inlet end to said outlet end, an annular fuel burner unit in said shell between said fan and said inlet end defining a ring structure adjacent the outer wall of the shell surrounding an open center region and forming a circular flame zone concentric with the shell axis, and an airfoil member in said shell upstream of the burner unit between the latter and said inlet end including a cylindrical center tube portion extending axially through the open center region of said ring structure to a location adjacent the motor of said fan to form an inner core stream of cooling air for cooling said motor, and said airfoil member having a truncated conical skirt portion jointed to the upstream end of said center tube portion and diverging outwardly and downstream therefrom to a location disposing the downstream edge of the skirt portion spaced upstream of and adjacent the burner ring structure to produce turbulence conditions providing substantially even temperatures across the whole area of said outlet end.

2. Apparatus as defined in claim 1, wherein said burner ring structure comprises an inner cylindrical ring of sheet material, an outer cylindrical ring of sheet material coaxial with and spaced outwardly from said inner ring, and a fuel pipe arranged in a closed circle path in a plane perpendicular to the axis of the shell joined to the upstream edges of said inner and outer rings to define a downstream-opening annular chamber therebetween in which combustion occurs, said pipe having fuel outlet orifices opening into said combustion chamber.

3. Agricultural products-drying heater apparatus for drying agricultural products in bins to which the unit is coupled, comprising an axially elongated substantially cylindrical tubular shell having an ambient air inlet end and a heated air outlet end, a motor driven propeller-type fan mounted in said shell intermediate said ends for producing a current of air in said shell flowing from said inlet end to said outlet end, an annular fuel burner unit in said shell between said fan and said inlet end defining a ring structure adjacent the outer wall of the shell surrounding an open center region and forming a circular flame zone concentric with the shell axis, and an airfoil member in said shell upstream of the burner unit between the latter and said inlet end including a cylindrical center tube portion extending axially through the open center region of said ring structure to a location adjacent the motor of said fan to form an inner core stream of cooling air for cooling said motor, said airfoil member having a truncated conical skirt portion joined to the upstream end of said center tube portion and diverging outwardly and downstream therefrom to a location adjacent the burner ring structure to produce turbulence conditions providing substantially even temperatures across the whole area of said outlet end, said burner ring structure comprising an inner cylindrical ring of sheet material, an outer cylindrical ring of sheet material coaxial with and spaced outwardly from said inner ring, and a fuel pipe arranged in a closed circle path in a plane perpendicular to the axis of the shell joined to the upstream edges of said inner and outer rings to define a downstream opening annular chamber therebetween in which combustion occurs, said pipe having fuel outlet orifices opening into said combustion chamber, said outer ring including a radially outwardly projecting flange extending continuously around the same at its downstream edge.

4. Apparatus as defined in claim 3 wherein the downstream edge of said conical skirt portion of said airfoil member is located closely adjacent and radially inwardly of said inner ring, and wherein said center tube portion extends through and downstream beyond the open center space surrounded by said inner ring.

5. Apparatus as defined in claim 3, wherein said conical skirt portion diverges downstream to a diameter close to the internal diameter of said ring structure.

6. Apparatus as defined in claim 3, wherein said tubular shell defines a discontinuous tubular wall having two axially spaced sections of uniform diameter extending from said inlet end to said outlet interrupted by a circumferential slot forming an inlet for secondary air.

7. Agricultural products drying heater apparatus for drying agricultural products in bins to which the unit is coupled, comprising an axially elongated substantially cylindrical tubular shell having an ambient air inlet end and a heated air outlet end, a motor-driven propeller-type fan mounted in said shell intermediate said ends for producing a current of air in said shell flowing from said inlet end to said outlet end, an annular fuel burner unit in said shell between said fan and said inlet end defining a ring structure adjacent the outer wall of the shell surrounding an open center region and forming a circular flame zone concentric with the shell axis, and an airfoil member in said shell upstream of the burner unit between the latter and said inlet end including a cylindrical center tube portion extending axially through the open center region of said ring structure to a location adjacent the motor of said fan to form an inner core stream of cooling air for cooling said motor, said air foil member having a truncated conical skirt portion joined to the upstream end of said center tube portion and diverging outwardly and downstream therefrom to a location adjacent the burner ring structure to produce turbulence conditions providing substantially even temperatures across the whole area of said outlet end, said tubular shell defining a discontinuous tubular wall having two axially spaced sections of uniform diameter extending from said inlet end to said outlet interrupted by a circumferential slot forming an inlet for secondary air.

8. Agricultural products drying heater apparatus for drying agricultural products in bins to which the unit is coupled, comprising an axially elongated substantially cylindrical tubular shell having an ambient air inlet end and a heated air outlet end, a motor driven propeller-type fan mounted in said shell intermediate said ends for producing a current of air in said shell flowing from said inlet end to said outlet end, an annular fuel burner unit in said shell between said fan and said inlet end defining a ring structure adjacent the outer wall of the shell surrounding an open center region and forming a circular flame zone concentric with the shell axis, and an airfoil member in said shell upstream of the burner unit between the latter and said inlet end including a cylindrical center tube portion extending axially through the open center region of said ring structure to a location adjacent the motor of said fan to form an inner core stream of cooling air for cooling said motor, said airfoil member having a truncated conical skirt portion joined to the upstream end of said center tube portion and diverging outwardly and downstream therefrom to a location adjacent the burner ring structure to produce turbulence conditions providing substantially even temperatures across the whole area of said outlet end, said conical skirt portion diverging downstream to a diameter close to the internal diameter of said ring structure, said tubular shell defining a discontinuous tubular wall having two axially spaced sections of uniform diameter extending from said inlet end to said outlet end interrupted by a circumferential slot forming an inlet for secondary air.